H. KATTENHORN.
Treating Bone Black.
No. 22,734. Patented Jan'y 25, 1859.
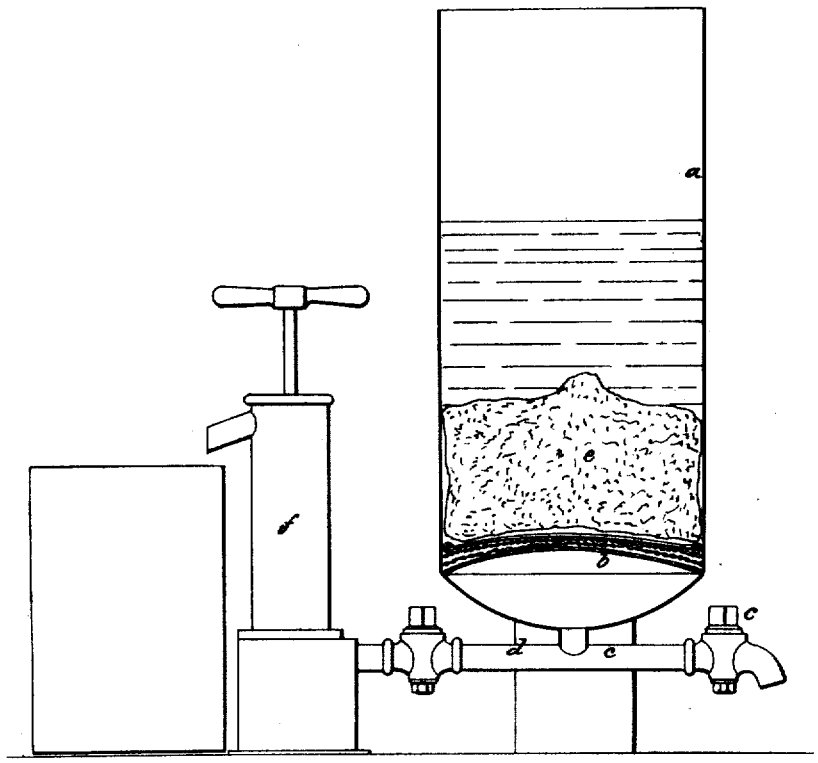
Witnesses: J. P. Pirsson, Carl Schumann
Inventor: Henry Kattenhorn

UNITED STATES PATENT OFFICE.

HENRY KATTENHORN, OF NEW YORK, N. Y.

IMPROVEMENT IN REVIVIFICATION OF BONE-BLACK.

Specification forming part of Letters Patent No. 22,734, dated January 25, 1859.

*To all whom it may concern:*

Be it known that I, HENRY KATTENHORN, of New York, county of New York, and State of New York, have invented certain new and useful Improvements in Treating Bone-Black in the Manufacture of Sugar; and I do hereby declare that the following is a full, clear, and exact description of the same, reference being made to the annexed drawing, making a part of this specification, which is a side view or elevation, partly in section, of the apparatus employed—that is to say:

This improvement relates to the washing of the bone-black or animal charcoal after the process of filtering for the purpose of saving the sugar remaining as well as removing the albumen, gluten, &c., with which the bone-black has become charged; and it consists in washing the black in a vessel so constructed that the pressure of the atmosphere can be applied to the surface of the washing-water to drive it rapidly and forcibly through the mass.

In the method heretofore in use the bone-black is washed by being placed in a flannel or other suitable bag, which rests upon wire-gauze at the bottom of a cylindrical vessel. The bag fills the entire diameter of the vessel, and water being poured upon the top percolates slowly through, running off through a tube below into a receptacle, as this water is to be saved on account of the value of the matters washed out from the black. It is found that in a short time the water becomes so charged with the saccharine and other matters that it goes through but very slowly, and it is necessary to pour on more water to dilute the portion which is working through. The bone-black thus washed may be again employed, though not to the same extent as at first; but the degree to which it may be so employed depends very much upon the sufficiency of the washing.

The method I have adopted will be apparent from the following description: At $a$ in the annexed drawing is seen a cylindrical vessel having a grating and wire-gauze, $b$, and delivery-pipe $c$ at bottom. The bone-black is shown within its appropriate bag at $e$, and thus far the apparatus is of ordinary construction, and is operated by pouring water into $a$, when, by opening the stop-cock $c'$, the water will run out, being caught in a suitable tank. To this washing apparatus I add a pipe, $d$, extending to a lifting-pump, $f$, by means of which the water and air may be exhausted from beneath the wire-gauze, and thus the pressure of the atmosphere be brought to force the water in $a$ rapidly through the mass. The effect of this will be, first, that a much less quantity of water suffices, and, as this water must be subsequently evaporated, this item is of considerable importance, and, secondly, that the pressure and rapid passing of the water carries out more of the gluten and other feculent matters than by the old process, unless when a large quantity of water was used and considerable time given.

The precise form and arrangement of pump and washing-vessel which I have herein described are not, of course, essential to the performance of the operation, since the washing-vessel may be connected with any receptacle in which a vacuum is maintained.

I claim as of my invention—

The method of washing bone-black or animal charcoal in the purifying of sugar, substantially as herein described.

In testimony whereof I have hereunto subscribed my name.

HENRY KATTENHORN.

Witnesses:
J. P. PIRSSON,
CARL AMANN.